United States Patent
Gottschalk-Gaudig et al.

(10) Patent No.: US 7,951,848 B2
(45) Date of Patent: May 31, 2011

(54) AQUEOUS DISPERSIONS OF PARTIALLY HYDROPHOBIC SILICAS

(75) Inventors: Torsten Gottschalk-Gaudig, Mehring (DE); Klaus Obermeir, Burghausen (DE)

(73) Assignee: Wacker Chemie AG, Munich (DE)

(*) Notice: Subject to any disclaimer, the term of this patent is extended or adjusted under 35 U.S.C. 154(b) by 201 days.

(21) Appl. No.: 11/908,659

(22) PCT Filed: Mar. 9, 2006

(86) PCT No.: PCT/EP2006/002181
§ 371 (c)(1), (2), (4) Date: Sep. 14, 2007

(87) PCT Pub. No.: WO2006/097240
PCT Pub. Date: Sep. 21, 2006

(65) Prior Publication Data
US 2008/0096984 A1 Apr. 24, 2008

(30) Foreign Application Priority Data
Mar. 17, 2005 (DE) .......................... 10 2005 012 409

(51) Int. Cl.
*C01B 33/141* (2006.01)
*C01B 33/14* (2006.01)
(52) U.S. Cl. .......................................... 516/81; 423/335
(58) Field of Classification Search ........................ 516/81
See application file for complete search history.

(56) References Cited

U.S. PATENT DOCUMENTS

| | | | |
|---|---|---|---|
| 2,515,949 A | 7/1950 | Di Maio | |
| 2,892,797 A | 6/1959 | Alexander et al. | |
| 3,830,738 A | 8/1974 | Cottrell | |
| 3,963,627 A | 6/1976 | Cottrell | |
| 4,273,589 A | 6/1981 | Nauroth et al. | |
| 4,308,074 A | 12/1981 | Nauroth et al. | |
| 4,995,995 A * | 2/1991 | Garvey et al. ................ | 508/143 |
| 5,686,054 A | 11/1997 | Barthel et al. | |
| 6,191,122 B1 | 2/2001 | Lux et al. | |
| 2003/0130379 A1 | 7/2003 | Panz et al. | |
| 2004/0131527 A1 * | 7/2004 | Gottschalk-Gaudig et al. .......................... | 423/335 |

FOREIGN PATENT DOCUMENTS

| | | |
|---|---|---|
| CA | 1117734 | 2/1982 |
| CA | 2201186 C | 10/2000 |
| CN | 1053641 C | 6/2000 |
| CN | 1513857 A | 7/2004 |
| DE | 2107082 A | 8/1971 |
| DE | 2628975 C2 | 7/1989 |
| DE | 2729244 C2 | 6/1990 |
| DE | 40 06 392 A1 | 9/1990 |
| DE | 4419234 A1 | 12/1995 |
| EP | 0 736 489 A1 | 10/1996 |
| EP | 0 798 348 A1 | 10/1997 |
| EP | 0798348 * | 10/1997 |
| EP | 1 124 693 A1 | 8/2001 |
| EP | 1 281 734 A1 | 2/2003 |
| EP | 1 433 749 A1 | 6/2004 |
| WO | WO 00/20221 | 4/2000 |
| WO | WO 2005/092989 A1 | 6/2005 |

OTHER PUBLICATIONS

Heath, et al., "Influence of pH, Electrolyte, and Poly(Vinyl Alcohol) Addition on the Rheological Behavior of Aqueous Silica (Aerosil) Disp.," J. Collid Interface Sci., 1983, Vol. 93, pp. 320-329.
Nguyen et al., "Direct Yield Stress Measurement with the Vane Method,"J. Rheol., 1985, Vol. 28, pp. 335 347.
Sears, G.W., Jr., "Determination of Specific Surface Area of Colloidal Silica by Titration with Sodium Hydroxide," Analytical Chemistry, 1956, Vol. 28, No. 12, pp. 1981-1983.
Influence of the Partial Hydrophobization of Fumed Silica by Hexamethyldisilazane on Interactions with Water, Gun'Ko et al., Langmuir, vol. 19, pp. 10816-10828 (published on Dec. 23, 2003).

* cited by examiner

*Primary Examiner* — Ling-Siu Choi
*Assistant Examiner* — Chun-Cheng Wang
(74) *Attorney, Agent, or Firm* — Brooks Kushman P.C.

(57) ABSTRACT

Aqueous dispersions of partly hydrophobic silica exhibit a smooth change in viscosity with pH over a wide pH range, without gelling or exhibiting local maxima. The dispersions have numerous uses, including use in O/W Pickering emulsions.

13 Claims, No Drawings

AQUEOUS DISPERSIONS OF PARTIALLY HYDROPHOBIC SILICAS

CROSS-REFERENCE TO RELATED APPLICATION

This application is the U.S. national phase of PCT Appln. No. PCT/EP2006/002181 filed Mar. 9, 2006 which claims priority to German application 10 2005 012 409.7 filed Mar. 17, 2005.

BACKGROUND OF THE INVENTION

1. Field of the Invention

The invention relates to aqueous dispersions of partially hydrophobic silicas, to a process for preparing them, to their use for stabilizing emulsions, and to their use as additives for rheology control of water-based coating materials, adhesives, and sealants.

2. Description of the Related Art

Aqueous dispersions of silicas find use in the chemomechanical planarizing of metal surfaces, in the semiconductor sector, for coating papers such as ink-jet papers, as rheological additives and/or antisedimentation agents in water-based paints, coatings, adhesives, and sealants, in the production of latex products such as gloves, in the production of gel batteries, and in the stabilizing of emulsifier-free Pickering emulsions.

The flow properties and the colloidal stability of aqueous silica dispersions are critically influenced by the pH. Thus, aqueous dispersions of silicas, particularly at pH levels in the neutral range, exhibit high viscosities and an inherent colloidal instability.

Aqueous silica dispersions are commonly stabilized electrostatically by altering the surface charge of the silica particles. Hence it is known from the specification of DE 40 06 392 that colloidally stable and low-viscosity dispersions of hydrophilic silicas can be obtained through establishing a pH in the basic range. A disadvantage here is that at pH levels in the region of the neutral point, i.e., at a pH of around 7, which is required for numerous applications, the dispersions exhibit an uncontrolled increase in viscosity or even gelling, as shown for example in D. Heath, T. F. Tadros, J. Colloid Interface Sci. 1983, 93, 320. A further lowering of the pH beyond the neutral point then leads to a further fall in the viscosity. This behavior on the part of aqueous dispersions of hydrophilic silicas has the disadvantage that even small changes in the pH, of the kind that may occur, for example, during the formulating of complex mixtures, can lead to uncontrollable fluctuations in the flow properties of the formulation.

It is known, furthermore, from the specifications EP 1 124 693 A1, EP 736489 and DE 102 38 463 A1 that aqueous silica dispersions can be stabilized using aluminum salts and, from U.S. Pat. No. 2,892,797, by aluminates. A disadvantage here is that in the region of the neutral point, i.e., at a pH of 7, these dispersions tend toward instability, which can lead to an uncontrolled increase in the viscosity or even to gelling. Furthermore, the addition of aluminum salts may have adverse consequences in certain applications, for example, such as in the coating of ink-jet papers and in the rheology control of water-based epoxy resins, for example.

SUMMARY OF THE INVENTION

It is an object of the invention to overcome the disadvantages of the prior art and to provide silica dispersions which with a high solids content in the pH range of 5-12, and without addition of further stabilizers, are colloidally stable and hence storable and in the pH range of 5-8 do not exhibit any local or absolute viscosity maximum but instead display a continuous increase in the viscosity with falling pH.

The invention provides silica dispersions characterized in that they comprise partially hydrophobic silica at a dispersion pH of 5 to 12.

DETAILED DESCRIPTION OF THE PREFERRED EMBODIMENT

Colloidally stable means that during the 4-week storage the dispersions do not exhibit any marked increase in viscosity and that the average particle diameter, measured by means of dynamic light scattering, remains constant. Colloidal stability is a prerequisite for appropriate storage properties. Aqueous dispersions which, in the course of storage, display an uncontrolled increase in viscosity, or even gelling, are frequently no longer suitable for further processing, since high viscosities impact adversely on processing operations such as pump conveying or stirring.

A continual increase in viscosity with falling pH is of advantage over the fluctuating pH dependence known from the prior art, since if a defined pH is set, regions of unwanted and partially uncontrollable high viscosity and hence more difficult manageability do not occur.

Surprisingly, and in no way foreseeably for the skilled worker, it has now been found that, when using partially hydrophobic silica, it is possible to prepare dispersions of high solids content that in the pH range of 5-12 exhibit excellent colloidal stability even after long storage and in the pH range of 5-8 exhibit no local or absolute viscosity maximum, i.e., display a continual increase in viscosity.

Partially hydrophobic silica in this context means silicas of the kind described in the laid-open specification EP 1 433 749 A1. For the silicas used in accordance with the invention this means that the surface of the silica is neither completely hydrophobicized, i.e., silylated, nor that the surface of the silica is completely hydrophilic, i.e., unsilylated. Specifically this means that the silicas used in accordance with the invention have a silanol group density of 0.9 to 1.7 silanol groups/$nm^2$, a carbon content of 0.1% to 2%, and a methanol number of less than 30. The silanol group density is obtainable by means of acid-based titration, as given in G. W. Sears, Anal. Chem. 1956, 28, 1981; the carbon content can be determined by means of elemental analysis; and the methanol number is the percentage fraction of methanol which must be added to the water phase in order to achieve complete wetting of the silica, i.e., complete sunken incorporation of the silica in the test liquid.

To prepare the dispersions of the invention, the partially hydrophobic silicas are added to the water phase at a pH of 7 to 12, preferably at a pH of 8 to 11, and more preferably at a pH of 8.5 to 10.5, and are incorporated by spontaneous wetting, or by shaking, such as with a tumble mixer, or a high-speed mixer, or by stirring, such as by means of cross-arm stirrers or dissolvers. In this context it is proven advantageous to monitor the pH during the addition of the partially hydrophobic silica, during incorporation, and during subsequent dispersing, at regular intervals, and, in the event of any deviation, to correct it to the desired, target level by adding acid or base. Adjusting or correcting the pH level can be done using commercially customary organic and inorganic acids and bases, i.e., Brönsted acids such as aqueous or gaseous HCl, aqueous or anhydrous $HNO_3$, $H_2SO_4$, $H_3PO_4$, p-toluenesulfonic acid, citric acid, or Brönsted bases, such as aqueous or gaseous ammonia, aqueous or anhydrous NaOH, KOH, $CaCO_3$, CaO, Na methoxide or organic amines.

In the case of low particle concentrations, below 10% by weight, simple stirring is generally sufficient to incorporate the particles into the liquid. Preference is given to incorporating the particles into the liquid at a high shear rate.

Prior to its incorporation the partially hydrophobic silica may be in a packaged form, such as in bags, or in storage in a loose form, such as in silos or large-scale containers, for example. The partially hydrophobic silicas can be metered in via bag shaking, via metering silos with or without weighing, or by direct conveying from storage silos or large-scale containers by means of suitable conveying equipment such as compressed-air membrane pumps or fans.

After or in parallel with the incorporation, the particles are dispersed. Parallel dispersing is preferred. Parallel dispersing means that the start of the metered addition and incorporation of the silica into the aqueous phase is accompanied by the start of the dispersing operation. This can be done by means of a dispersing system in the first vessel, or by pumped circulation in external pipelines, containing a dispersing member, from the vessel, with preferably closed-loop recycling to the vessel. By means of a partial recycle and partial continuous withdrawal, this operation can preferably be made continuous.

Apparatus suitable for these purposes includes, preferably, high-speed stirrers, high-speed dissolvers, with peripheral speeds of 1-50 m/s, for example, high-speed rotor-stator systems, sonolators, shearing gaps, nozzles or ballmills.

The incorporating and dispersing of the silica can take place preferably by means of inductors, such as Conti TDS 4 from Ystral, for example. In that case the pulverulent, partially hydrophobic silica is metered directly into the shearing gap by suction, by vacuum or by forced conveying, by means of pumps, for example.

Particularly appropriate for dispersing the partially hydrophobic silicas is the use of ultrasound in the range from 5 Hz to 500 kHz, preferably 10 kHz to 100 kHz, and most preferably 15 kHz to 50 kHz. The ultrasonic dispersing can take place continuously or discontinuously. It can be done by individual ultrasonic transducers, such as ultrasound tips, or in continuous-flow systems containing one or more ultrasonic transducers, or systems separated if desired by a pipeline or pipe wall.

Dispersing may if appropriate take place through a combination of different methods: for example, preliminary dispersing by means of dissolvers or inductors, with subsequent fine dispersing by means of ultrasound treatment.

The preparation of the invention may take place in batch processes and in continuous processes. Continuous processes are preferred.

To prepare the dispersions of the invention it is preferred to use pure water, preferably fully deionized (DI) water having a conductivity of less than 100 μS/cm.

The processes of the invention have the advantage that they are very simple to implement and enable the preparation of aqueous dispersions having very high partially hydrophobic silica solids contents.

The dispersions of the invention preferably have a partially hydrophobic silica content of 5%-50%, more preferably 5%-35%, with particular preference 10%-35%, and with very particular preference 15%-30% by weight.

The aqueous dispersions of the invention having a high partially hydrophobic silica content are particularly characterized in that they have a pH in the range from 5 to 12, preferably 7-11, with particular preference 8- 10.5.

The aqueous dispersions of the invention having a high partially hydrophobic silica content are also characterized in particular in that low-viscosity dispersions are obtainable with a pH in the range from 5 to 12, preferably 7-11, more preferably 8-10.5. This means that dispersions having a pH in the range from 5 to 12, preferably 7-11, with particular preference 8-10.5 and preferably a silica content of 5% to 50% by weight, have a viscosity of less than 1000 mPas, preferably less than 800 mPas, more preferably a viscosity of less than 700 mPas, and most preferably a viscosity of less than 500 mPas, the viscosity being measured using a cone-plate sensor system with a 105 μm measuring gap, at 25° C. and a shear rate of 100 $s^{-1}$.

The aqueous dispersions of the invention having a high partially hydrophobic silica content are further characterized in that a graduated or continuous reduction in the dispersion pH from 9 to 4 is accompanied by a gradual continuous increase in the viscosity, but without the occurrence of a local viscosity maximum of any significance—that is, one going beyond the typical experimental scatter. This means in particular that the ratio $\eta_{7/9}=\eta_7/\eta_9$, formed from the shear viscosity at a pH of 9 ($\eta_9$) and at a pH of 7 ($\eta_7$), and the ratio $\eta_{4/7}=\eta_4/\eta_7$, formed from the shear viscosity at a pH of 7 ($\eta_7$) and at a pH of 4($\eta_4$), each have a value of greater than or equal to 1, preferably a value of 1 to 1000, more preferably a value of 1 to 500, and most preferably a value of 1 to 100, the viscosity being measured with a cone-plate sensor system with a 105 μm measuring gap, at 25° C. and a shear rate of 100 $s^{-1}$.

The aqueous dispersions of the invention having a high partially hydrophobic silica content are further characterized in that they exhibit an excellent storage stability. This means that the viscosity of a dispersion having a pH in the range from 5 to 12, preferably 7-11, with particular preference 8-10.58, after a storage time of 4 weeks at 40° C. has risen by not more than a factor of 5, preferably by not more than a factor of 2.5, more preferably by not more than a factor of 2.0, and most preferably by not more than a factor of 1.5, as compared with the viscosity immediately after preparation of the dispersion, the viscosity being measured using a cone-plate sensor system with a 105 μm measuring gap, at 25° C. and a shear rate of 100 $s^{-1}$.

The aqueous dispersions of the invention having a high partially hydrophobic silica content are further characterized in that they exhibit an excellent storage stability. This means that the dispersions having a pH in the range from 5 to 12, preferably 7-11, and most preferably 8-10.5, after a storage time of 4 weeks at 40° C., have a yield point of less than 100 Pa, preferably less than 10 Pa, more preferably less than 1 Pa, and most preferably less than 0.1 Pa, measured in each case using the vane method at 25° C. in accordance with Q.D. Nguyen, D. Boger, J. Rheol. 1985, 29, 335.

The dispersions of the invention are further characterized in that in the pH range of 5-12 they exhibit a negative ZETA potential. Preferably the ZETA potential at pH of 9 is less than 5 mV, more preferably less than −10 mV, and most preferably less than −15 mV. The ZETA potential can be determined, for example, by measuring the colloid vibration potential, using, for example, the ZETA potential probe DT300 from Dispersion Technologies, or by determining the electrophoretic mobility by laser Doppler velocimetry using the Zetasizer ZS from Malvern Instruments.

The dispersions of the invention are further characterized in that they have an isoelectric point (iep) at a pH<4, the isoelectric point being defined as the pH of a dispersion for which the ZETA potential has the value zero.

The dispersions of the invention are further characterized in that the dispersed particles are in the form of finely divided sinter aggregates.

These sinter aggregates are characterized in that, in the case of particle size determination by means of quasielastic light scattering, the measured hydrodynamic equivalent diameter is greater by a factor of at least 2, preferably by a factor of 2.5 to 50, more preferably by a factor 2.8 to 30, based in each case on a specific surface area of 100 m$^2$/g—in the case of a smaller or larger surface area, the factor decreases or increases linearly in accordance—than the diameter of the primary particles which is obtainable arithmetically in accordance with the formula a=6/A$_{BET}$*d, where A$_{BET}$ is the specific BET surface area of the initial hydrophilic silica, as measured by means of nitrogen adsorption in accordance with DIN 66131, and d is the density of the primary particles.

The dispersions of the invention are further characterized in that if desired they comprise fungicides or bactericides, such as methylisothiazolones or benzisothiazolones.

The amount of further organic adjuvants other than fungicides or bactericides in the aqueous dispersion of the invention is preferably less than 5%, more preferably less than 1%, most preferably less than 0.5%, and in particular less than 0.1% by weight.

In particular, the amount of dispersing assistants such as surfactants or protective colloids in the aqueous dispersions of the invention is less than 5%, preferably less than 1%, more preferably less than 0.5%, by weight, and in particular the aqueous dispersions of the invention contain no dispersing assistants.

The amount of organic and inorganic salts or electrolytes, such as NaCl, KCl or AlCl$_3$, in the aqueous dispersion of the invention is preferably less than 5%, more preferably less than 1%, yet more preferably less than 0.1%, and in particular less than 0.01% by weight. With very particular preference no organic or inorganic salts are added to the dispersion of the invention.

The conductivity of the aqueous dispersion of the invention at a pH of 9.5 is preferably less than 100 mS/cm, more preferably less than 10 mS/cm, yet more preferably less than 5 mS/cm, and in particular less than 1 mS/cm.

The partially hydrophobic silica particles preferably have an average primary particle size d PP of 0.5 to 1000 nm, more preferably 5 to 100 nm, most preferably 5 to 50 nm. Suitable methods of measuring this are, for example, transmission electron microscopy or high-resolution scanning electron microscopy, in the field emission mode, for example.

The partially hydrophobic silica particles preferably have an average secondary structure particle size or aggregate particle size d-Aggr of 50 to 5000 nm, more preferably of 100 to 800 nm, most preferably of 120 to 500 nm, measured as the hydrodynamic equivalent diameter.

Suitable methods of measuring this are, for example, dynamic light scattering or photon correlation spectroscopy, performed in backscattering for the purpose of measuring concentrations >0.01% by weight, and/or corrected by means of cross-correlation against multiple scattering.

The invention further provides the preparation of particle-stabilized O/W emulsions (Pickering emulsions) using the dispersions of the invention.

In this context it has been found that the best results are given by the process described in the text below. A dispersion of the invention with a low viscosity at a pH of 9 is acidified to a pH of less than 5 by addition of a protic acid, hydrochloric acid for example. The oil phase is then incorporated by emulsification into the silica dispersion, which now has a higher viscosity, emulsification taking place by means for example of a high-speed mixing apparatus such as dissolvers, rotor-stator systems, or in ultrasonicators or other emulsifying machines. If desired, water can be metered in additionally after the total amount of oil has been incorporated. This can be done under shearing conditions or by means of simple stirring.

If desired, it is also possible first to introduce the oil phase and then to incorporate the dispersion of the invention by dispersing with stirring, by means for example of high-speed mixing apparatus such as dissolvers, rotor-stator systems, or in ultra-sonicators.

If desired, the resulting emulsions can again be subjected to a further emulsifying operation for the purpose of improving their properties, such an operation taking place, for example, in high-pressure homogenizers or continuous-flow ultrasound cells.

If desired, the pH of the emulsion obtained can be adjusted to the desired level by addition of acid, hydrochloric acid for example, or base, aqueous NaOH solution for example. This can be done with simple stirring or under shearing conditions, in a dissolver, for example. Simple stirred incorporation is preferred.

If desired, the ionic strength of the aqueous phase of the emulsion can be adjusted to the desired ionic strength by addition of electrolyte, NaCl for example, in order to increase the viscosity of the emulsion. This can be done with simple stirring or under shearing conditions, in a dissolver, for example. Simple stirred incorporation is preferred.

For the purpose of increasing the viscosity it is possible to add 1·10$^{-4}$ mol/l to 10 mol/l, preferably 0.5*10$^{-3}$ mol/l to 5 mol/l, and more preferably 1*10$^{-3}$ mol/l to 1 mol/l of electrolyte to the emulsion.

The invention relates to the use of the aqueous dispersions of the invention in the coating of surfaces, such as mineral substrates, such as metals, steel or iron for example, with the aim for example of corrosion control.

The invention relates to the use of the aqueous dispersions of the invention in the preparation of paints and coatings, synthetic resins, adhesives, and sealants, especially those produced on an aqueous basis.

The invention relates to the use of the aqueous dispersions of the invention in the preparation of paints and coatings, synthetic resins, adhesives, and sealants, in particular for the purpose of adjusting and controlling the rheology.

The invention relates to the use of the aqueous dispersions of the invention in the preparation of paints and coatings, synthetic resins, adhesives, and sealants, in particular for the purpose of improving their mechanical properties, such as improving the scratch resistance, for example.

The invention relates to the use of the aqueous dispersions of the invention in the coating of print media, particularly of those papers which are used in contactless printing processes; examples are papers for inkjet printers and, in particular, high-gloss papers.

EXAMPLES

Example 1

300 g of a partially hydrophobic fumed silica having a residual silanol content of 71% and a carbon content of 0.95%, obtained by reacting a hydrophilic starting silica having a specific BET surface area of 200 m$^2$/g (available under the name HDK® N20 from Wacker-Chemie GmbH, Munich) with dimethyldichlorosilane in accordance with EP 1433749 A1, are incorporated by stirring, in portions, on a dissolver at 300-600 rpm into 1000 g of fully deionized (DI) water. The pH of the dispersion is maintained within a range of 9-9.5 by metered addition of aqueous NaOH. Following complete addition of the silica, dispersing is continued at 6000 rpm for 30 minutes. The low-viscosity dispersion obtained is subsequently pumped with a flow rate of 5-10 ml/min through a continuous-flow ultrasound cell (from Hielscher; 24 kHz; 400 W). The result is a highly mobile silica dispersion, whose analytical data are summarized in table 1.

Example 2

500 g of a partially hydrophobic fumed silica having a residual silanol content of 65% and a carbon content of 1.4%, obtained by reacting a hydrophilic starting silica having a specific BET surface area of 200 $m^2/g$ (available under the name HDK® N20 from Wacker-Chemie GmbH, Munich) with hexamethyldisilazane in accordance with EP 1433749 A1, are incorporated by stirring, in portions, on a dissolver at 300-600 rpm into 1000 g of fully deionized (DI) water. The pH of the dispersion is maintained within a range of 9-9.5 by metered addition of aqueous NaOH. Following complete addition of the silica, dispersing is continued at 6000 rpm for 30 minutes. The low-viscosity dispersion obtained is subsequently pumped with a flow rate of 5-10 ml/min through a continuous-flow ultrasound cell (from Hielscher; 24 kHz; 400 W). The result is a highly mobile silica dispersion, whose analytical data are summarized in table 1.

Example 3

250 g of a partially hydrophobic fumed silica having a residual silanol content of 75% and a carbon content of 1.3%, obtained by reacting a hydrophilic starting silica having a specific BET surface area of 300 $m^2/g$ (available under the name HDK® T30 from Wacker-Chemie GmbH, Munich) with dimethyldichlorosilane in accordance with EP 1433749 A1, are incorporated by stirring, in portions, on a dissolver at 300-600 rpm into 1000 g of fully deionized (DI) water. The pH of the dispersion is maintained within a range of 9-9.5 by metered addition of aqueous NaOH. Following complete addition of the silica, dispersing is continued at 6000 rpm for 30 minutes. The low-viscosity dispersion obtained is subsequently pumped with a flow rate of 5-10 ml/min through a continuous-flow ultrasound cell (from Hielscher; 24 kHz; 400 W). The result is a highly mobile silica dispersion, whose analytical data are summarized in table 1.

Example 4

300 g of a partially hydrophobic fumed silica having a residual silanol content of 71% and a carbon content of 0.95%, obtained by reacting a hydrophilic starting silica having a specific BET surface area of 200 $m^2/g$ (available under the name HDK® N20 from Wacker-Chemie GmbH, Munich) with dimethyldichlorosilane in accordance with EP 1433749 A1, are incorporated by stirring, in portions, on a dissolver at 300-600 rpm into 1000 g of fully deionized (DI) water. The pH of the dispersion is maintained within a range of 9-9.5 by metered addition of aqueous NaOH. Following complete addition of the silica, the pH is adjusted to 8 by addition of aqueous HCl solution (1 molar) and then dispersing is continued at 6000 rpm for 30 minutes. The low-viscosity dispersion obtained is subsequently pumped with a flow rate of 5-10 ml/min through a continuous-flow ultrasound cell (from Hielscher; 24 kHz; 400 W). The result is a highly mobile silica dispersion, whose analytical data are summarized in table 1.

Example 5

300 g of a partially hydrophobic fumed silica having a residual silanol content of 71% and a carbon content of 0.95%, obtained by reacting a hydrophilic starting silica having a specific BET surface area of 200 $m^2/g$ (available under the name HDK® N20 from Wacker-Chemie GmbH, Munich) with dimethyldichlorosilane in accordance with EP 1433749 A1, are incorporated by stirring, in portions, on a dissolver at 300-600 rpm into 1000 g of fully deionized (DI) water. The pH of the dispersion is maintained within a range of 9-9.5 by metered addition of aqueous NaOH. Following complete addition of the silica, the pH is adjusted to 10 by addition of aqueous NaOH solution (1 molar) and then dispersing is continued at 6000 rpm for 30 minutes. The low-viscosity dispersion obtained is subsequently pumped with a flow rate of 5-10 ml/min through a continuous-flow ultrasound cell (from Hielscher; 24 kHz; 400 W). The result is a highly mobile silica dispersion, whose analytical data are summarized in table 1.

Example 6

Comparative Example 300 g of a partially hydrophobic fumed silica having a residual silanol content of 71% and a carbon content of 0.95%, obtained by reacting a hydrophilic starting silica having a specific BET surface area of 200 $m^2/g$ (available under the name HDK® N20 from Wacker-Chemie GmbH, Munich) with dimethyldichlorosilane in accordance with EP 1433749 A1, are incorporated by stirring, in portions, on a dissolver at 300-600 rpm into 1000 g of fully deionized (DI) water. The pH of the dispersion is maintained within a range of 9-9.5 by metered addition of aqueous NaOH. Following complete addition of the silica, the pH is adjusted to 4 by addition of aqueous HCl solution (1 molar) and then dispersing is continued at 6000 rpm for 30 minutes. The low-viscosity dispersion obtained is subsequently pumped with a flow rate of 5-10 ml/min through a continuous-flow ultrasound cell (from Hielscher; 24 kHz; 400 W). The result is a silica dispersion, whose analytical data are summarized in table 1.

TABLE 1

|  | Silica [%] | pH | Zeta potential [mV]; (pH 9) | $\eta$/Pas (pH 9) | $\eta$/Pas (pH 7) | $\eta$/Pas (pH 4) | $d_{Agg}$/nm (pH 9) | $n_{rel}$*) |
|---|---|---|---|---|---|---|---|---|
| Example 1 | 23.0 | 9.1 | −19.6 | 0.011 | 0.14 | 0.42 | 146 | 1.01 |
| Example 2 | 33.2 | 9.05 | −18.3 | 0.18 | 0.27 | 0.78 | 183 | 1.0 |
| Example 3 | 19.8 | 9.23 | −20.5 | 0.012 | 0.11 | 0.38 | 175 | 1.12 |
| Example 4 | 23.1 | 8.03 | −15.1 (pH 8) | 0.08 (pH 8) | 0.17 | 0.48 | 152 (pH 8) | 1.08 |

TABLE 1-continued

|  | Silica [%] | pH | Zeta potential [mV]; (pH 9) | η/Pas (pH 9) | η/Pas (pH 7) | η/Pas (pH 4) | $d_{Agg}$/nm (pH 9) | $n_{rel}$*) |
|---|---|---|---|---|---|---|---|---|
| Example 5 | 22.7 | 10.04 | −22.4 (pH 10) | 0.01 (pH 10) |  | 0.47 | 150 (pH 10) | 0.98 |
| Example 6 | 22.6 | 4.1 | −8.3 (pH 4) | — | — | 0.41 | 210 (pH 4) | 5.2 |

*)$n_{rel}$: ratio formed from the viscosity of the dispersion after 4 weeks at 40° C., divided by the viscosity of the dispersion immediately after preparation; measured in each case at the pH of the completed dispersion at 25° C. and at a shear rate of D = 100 s$^{-1}$ by means of a cone-plate system.

Solids content of the dispersion determined by the following method: 10 g of aqueous dispersion are admixed with an equal amount of ethanol in a porcelain dish, and evaporated in an N$_2$-flushed drying oven at 150° C. to constant weight. The mass m$_s$ of the dry residue gives the solids content as follows:

solids content/%=$m_s$*100/10 g.

ZETA potential of the dispersions measured by the following method: a dispersion is diluted to approximately 1.5% by weight silica using DI water having a pH identical to that of the dispersion. On a Zetasizer ZS from Malvern Instruments, the ZETA potential is measured over the pH range from 9.2 to 2, the pH adjustment being accomplished by means of an autotitrator in pH steps of 1.

Viscosity of the dispersion determined using a RS 600 rheometer from Haake with a cone-plate sensor system (105 μm measuring gap) at 25° C. and a shear rate D=100 s$^{-1}$.

Average diameter of the sinter aggregates measured by means of photon correlation spectroscopy by the following method: a dispersion is diluted to approximately 0.3% by weight silica using DI water having a pH identical to that of the dispersion. The sample is measured in backscattering at 25° C. on a Zetasizer ZS from Malvern Instruments. The average diameter of the aggregates is the z-average (cumulant average) and corresponds to the hydrodynamic equivalent diameter of the silica aggregates.

pH measured by means of combination pH electrode

Example 7

Preparation of an Emulsion 54 g of the silica dispersion described in example 1 with a solids content of 23% by weight are charged to a 500 ml stainless steel beaker. Aqueous HCl is added to set a pH of approximately 5. The suspension, which is now of higher viscosity, is admixed slowly with 150 g of a polydimethylsiloxane having a viscosity of 100 mPas (available under the name "AK100" from Wacker-Chemie GmbH, Munich (DE)) by metering over a period of about 15 minutes, with stirring at 10,000 rpm using an Ultraturrax and with water cooling. During this addition the temperature of the mixture ought not to rise above 60° C. The resulting firm mass, which is now of high viscosity, is subsequently admixed with 108 g of DI water, likewise at 10,000 rpm and slowly over a period of 15 minutes. During this addition the temperature of the mixture ought not to rise above 60° C. The result is a highly mobile, white O/W emulsion, whose analytical data are summarized in table 2.

TABLE 2

|  | $d_{50}$/μm | pH | η/Pas (pH 5.45 |
|---|---|---|---|
| Example 7 | 5.4 | 5.45 | 0.152 | average droplet diameter $d_{50}$, measured by means of Fraunhofer laser diffraction on a Sympatec Helos/BF using cell measurement.

pH measured by means of a combined pH electrode.

Viscosity of the emulsion determined using an RS 600 rheometer from Haake with a cone-plate sensor system (105 μm measuring gap) at 25° C. and a shear rate D=10 s$^{-1}$.

The invention claimed is:

1. An aqueous silica dispersion comprising partially hydrophobic fumed silica, the aqueous silica dispersion having a targeted pH in the range of 5 to 12, prepared by dispersing partially hydrophobic fumed silica into an aqueous phase while maintaining the pH of the aqueous phase between a pH of 7 and a pH of 12, and if the pH of the finished dispersion is not at the targeted value within the range of pH 5 to pH 12, adding acid or base to achieve the target pH, wherein the aqueous silica dispersion is colloidally stable without the addition of further stabilizers.

2. The silica dispersion of claim 1, having a partially hydrophobic fumed silica content of 5%-50% by weight.

3. The silica dispersion of claim 2, wherein the dispersion has a viscosity of less than 1000 mPa at a silica content of 5%-50% by weight and a shear rate of 100 s$^{-1}$.

4. The silica dispersion of claim 1, wherein the dispersion viscosity increases continuously when the pH is lowered from 9 to 4.

5. The silica dispersion of claim 1, wherein the dispersion has no local viscosity maximum over the pH range from 9 to 4.

6. The silica dispersion of claim 1, wherein the dispersion has a storage stability for which the viscosity of the dispersion having a pH in the range from 5 to 12 after a storage time of 4 weeks at 40° C. has risen by not more than a factor of 5 as compared with the viscosity immediately after preparation of the dispersion, the viscosity being measured using a cone-plate sensor system with a 105 μm measuring gap, at 25° C. and a shear rate of 100 s$^{-1}$.

7. The silica dispersion of claim 1, wherein the partially hydrophobic fumed silica particles have an average aggregate particle size of 50 to 5000 nm, measured as the hydrodynamic equivalent diameter.

8. An O/W Pickering emulsion comprising a silica dispersion of claim 1.

9. The O/W Pickering emulsion of claim 8, comprising at least one electrolyte which increases the viscosity of the emulsion.

10. A paint, coating, synthetic resin, adhesive, sealant or paper coating, comprising a silica dispersion of claim 1.

11. The aqueous silica dispersion of claim 1, wherein the silica of the partially hydrophobic fumed silica is in the form of sinter aggregates.

12. The aqueous silica dispersion of claim 1, wherein organic adjuvants other than fungicides or bacteriocides are present in a concentration of less than 5% by weight based on the weight of the continuous phase.

13. The aqueous silica dispersion of claim 1, wherein an average secondary structure particle size is between 100 nm and 800 nm.

* * * * *